United States Patent
Morioka et al.

(10) Patent No.: US 10,416,397 B2
(45) Date of Patent: Sep. 17, 2019

(54) OPTICAL RECEPTACLE, OPTICAL MODULE, AND METHOD FOR MANUFACTURING OPTICAL MODULE

(71) Applicant: Enplas Corporation, Saitama (JP)

(72) Inventors: Shimpei Morioka, Saitama (JP); Ayano Kon, Saitama (JP); Motohiko Maene, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/081,965

(22) PCT Filed: Feb. 20, 2017

(86) PCT No.: PCT/JP2017/006135
§ 371 (c)(1),
(2) Date: Sep. 4, 2018

(87) PCT Pub. No.: WO2017/150249
PCT Pub. Date: Sep. 8, 2017

(65) Prior Publication Data
US 2019/0094475 A1 Mar. 28, 2019

(30) Foreign Application Priority Data
Mar. 3, 2016 (JP) .................... 2016-041318

(51) Int. Cl.
*G02B 6/42* (2006.01)
(52) U.S. Cl.
CPC .......... *G02B 6/4206* (2013.01); *G02B 6/42* (2013.01); *G02B 6/4214* (2013.01); *G02B 6/4246* (2013.01)

(58) Field of Classification Search
None
See application file for complete search history.

(56) References Cited

U.S. PATENT DOCUMENTS

| 9,134,494 B2* | 9/2015 | Wang ............. G02B 6/32 |
| 9,733,438 B2* | 8/2017 | Yu ............... G02B 6/421 |
| 2005/0248770 A1* | 11/2005 | Lin ............. G01B 11/2441 356/489 |
| 2005/0254539 A1* | 11/2005 | Klimek ............. G02B 6/102 372/50.12 |
| 2011/0064358 A1 | 3/2011 | Nishimura |

(Continued)

FOREIGN PATENT DOCUMENTS

| JP | 2011-059484 A | 3/2011 |
| JP | 2012-194454 A | 10/2012 |
| JP | 2015-022267 A | 2/2015 |

OTHER PUBLICATIONS

International Search Report from International Application No. PCT/JP2017/006135 dated Apr. 25, 2017.

*Primary Examiner* — Eric Wong
(74) *Attorney, Agent, or Firm* — Brundidge & Stanger, P.C

(57) ABSTRACT

The optical receptacle according to the present invention has a first optical element and a second optical element. The first optical element and the second optical element are coupled to each other via a first fitting part of the first optical element and a second fitting part of the second optical element. The first optical element has a first optical surface and a second optical surface. The second optical element has a third optical surface, a fourth optical surface and a light-separating part.

9 Claims, 10 Drawing Sheets

(56) References Cited

U.S. PATENT DOCUMENTS

2014/0328558 A1* 11/2014 Morioka .............. G02B 6/4286
                                                        385/33
2015/0030285 A1   1/2015 Tanazawa
2016/0004020 A1*  1/2016 Shao ................... G02B 6/4246
                                                        385/24

* cited by examiner

OPTICAL RECEPTACLE, OPTICAL MODULE, AND METHOD FOR MANUFACTURING OPTICAL MODULE

TECHNICAL FIELD

The present invention relates to an optical receptacle, an optical module including the optical receptacle, and a manufacturing method of the optical module.

BACKGROUND ART

Conventionally, in optical communications using an optical transmission member such as an optical fiber and an optical waveguide, an optical module including a light emitting element such as a surface-emitting laser (e.g. a vertical cavity surface emitting laser (VCSEL)) has been used. Such an optical module includes an optical receptacle that operates such that light containing communication information emitted from a light emitting element is incident on an end surface of the optical transmission member.

An optical module that is intended to adjust the optical output or stabilize the output performance of a light emitting element against temperature variation, and includes a detection element for checking (monitoring) the intensity and the quantity of the emission light emitted from the light emitting element is known (see, for example, PTL 1).

PTL 1 discloses an optical module including a photoelectric conversion device in which a light-emitting element and a detection element are disposed on a substrate, and an optical receptacle disposed on the substrate of the photoelectric conversion device and configured to optically couple the light-emitting element and an end surface of an optical transmission member.

FIG. 1A is a sectional view schematically illustrating a configuration of optical module 10 disclosed in PTL 1, and FIG. 1B is a partially enlarged sectional view illustrating a configuration of light separation part 33 of optical module 10. FIG. 1B is a partially enlarged sectional view of a region indicated with the broken line in FIG. 1A. In FIGS. 1A and 1B, the hatching on the cross-section of optical receptacle 30 is omitted to illustrate light paths in optical receptacle 30.

As illustrated in FIG. 1A, optical module 10 disclosed in PTL 1 includes photoelectric conversion device 20 and optical receptacle 30. Optical receptacle 30 includes first optical surface 31 that allows incidence of emission light L emitted from light-emitting element 21; reflection surface 32 that reflects, toward optical transmission member 22 side, emission light L having entered optical receptacle 30 from first optical surface 31; light separation part 33 that separates emission light L reflected by reflection surface 32 into monitor light Lm directed toward detection device 24 side and signal light Ls directed toward optical transmission member 22 side; transmission surface 34 that allows, to reenter optical receptacle 30, signal light Ls emitted out of optical receptacle 30 at light separation part 33; second optical surface 35 that emits signal light Ls having entered optical receptacle 30 from transmission surface 34 such that the light is collected at end surface 23 of optical transmission member 22; and third optical surface 36 that emits monitor light Lm toward detection device 24. In addition, light separation part 33 is formed as a part of the internal surface of recess 37 formed in optical receptacle 30.

As illustrated in FIG. 1B, light separation part 33 of optical receptacle 30 disclosed in PTL 1 includes divided reflection surface 33a that totally reflects a part of incident light toward third optical surface 36 as monitor light Lm, and divided transmission surface 33b that allows another part of incident light to pass therethrough toward second optical surface 35 as signal light Ls. Divided reflection surface 33a and divided transmission surface 33b alternate in the inclination direction of divided reflection surface 33a.

In optical module 10 disclosed in PTL 1, emission light L which is emitted from light-emitting element 21 and is incident on first optical surface 31 is reflected by reflection surface 32 toward light separation part 33. Emission light L reaching light separation part 33 is separated into monitor light Lm and signal light Ls by divided reflection surface 33a and divided transmission surface 33b. Monitor light Lm separated by light separation part 33 (divided reflection surface 33a) is emitted from third optical surface 36 toward the light-receiving surface of detection element 24. On the other hand, signal light Ls separated by light separation part 33 (divided transmission surface 33b) is emitted out of optical receptacle 30 through light separation part 33, and then reenters optical receptacle 30 from transmission surface 34. The signal light Ls having reentered optical receptacle 30 from transmission surface 34 is emitted from second optical surface 35 toward end surface 23 of optical transmission member 22.

CITATION LIST

Patent Literature

PTL 1
Japanese Patent Application Laid-Open No. 2015-022267

SUMMARY OF INVENTION

Technical Problem

As described above, optical receptacle 30 disclosed in PTL 1 is disposed on photoelectric conversion device 20. From the viewpoint of achieving optical coupling between light-emitting element 21 and an end surface of optical transmission member 22 with high coupling efficiency, it is important to dispose optical receptacle 30 at a proper position with respect to photoelectric conversion device 20.

In the case where the optical receptacle has no light separation part 33, the positioning of optical receptacle 30 can be performed by observing the light-emitting surface of light-emitting element 21 from second optical surface 35 side through the second optical surface, reflection surface 32 and first optical surface 31.

When positioning optical receptacle 30 in the above-mentioned manner with optical module 10 disclosed in PTL 1, however, divided reflection surface 33a impedes the observation of the light-emitting surface, and the position of the light-emitting surface of light-emitting element 21 cannot be appropriately detected, and consequently, the positioning of optical receptacle 30 might not be performed. When the positioning is performed in this case, it is necessary to cause light-emitting element 21 to actually emit light, and receive the light with a light receiving device through optical transmission member 22 while measuring the coupling efficiency between light-emitting element 21 and the end surface of optical transmission member 22 in the state where optical transmission member 22 connected with the light receiving device is mounted on second optical surface 35 of optical module 10. That is, in optical receptacle 30 disclosed in PTL 1, an optical transmission member, a light receiving device and the like are required to be mounted in optical module 10, and light-emitting element 21 is required to be turned on for the positioning of optical receptacle 30, and as such the positioning takes much time and manpower.

An object of the present invention is to provide an optical receptacle that allows for appropriate detection of the position of a photoelectric conversion element, and for easy and appropriate positioning with respect to a photoelectric conversion device even when the optical receptacle is provided with a light separation part (divided reflection surface). In addition, another object of the present invention is to provide an optical module including the optical receptacle. Further, another object of the present invention is to provide a manufacturing method of the optical module.

Solution to Problem

An optical receptacle according to an embodiment of the present invention is configured to be disposed between an optical transmission member and a photoelectric conversion device, the photoelectric conversion device including a photoelectric conversion element and a detection device for monitoring emission light emitted from the photoelectric conversion element which are disposed on a substrate, the optical receptacle being configured to optically couple the photoelectric conversion element and an end surface of the optical transmission member, the optical receptacle including: a first optical device including a first fitting part disposed in a surface different from a surface opposite to the substrate, the first optical device being disposed on the substrate so as to be opposite to the photoelectric conversion element; and a second optical device including a second fitting part configured to be fitted to the first fitting part, the second optical device being disposed on the substrate so as to be opposite to the first optical device and the detection device. The first optical device includes a first optical surface configured to allow incidence of first emission light emitted from the photoelectric conversion element, or to emit, toward the photoelectric conversion element, reception light that is a part of second emission light that has been emitted from the end surface of the optical transmission member and has passed through an inside of the second optical device and the first optical device, and a second optical surface configured to emit the first emission light toward the second optical device, or to allow incidence of the reception light that has passed through the inside of the second optical device. The second optical device includes a third optical surface configured to allow incidence of the first emission light that has passed through the inside of the first optical device, or emit, toward the first optical device, the reception light that has passed through the inside of the second optical device, a fourth optical surface configured to emit, toward the end surface of the optical transmission member, signal light that is a part of the first emission light and has passed through the inside of the first optical device and the second optical device, or to allow incidence of the second emission light emitted from the end surface of the optical transmission member, and a light separation part disposed on a light path between the third optical surface and the fourth optical surface, and configured to separate the first emission light incident on the third optical surface into monitor light travelling toward the detection device and signal light travelling toward the end surface of the optical transmission member, or to advance, toward the third optical surface side, the reception light that is a part of the second emission light incident on the fourth optical surface. The light separation part includes a plurality of divided reflection surfaces that are surfaces inclined with respect to an optical axis of the first emission light, and a plurality of divided transmission surfaces that are surfaces perpendicular to optical axes of the first emission light and the second emission light. The plurality of divided reflection surfaces and the plurality of divided transmission surfaces are alternately disposed along an inclination direction of the divided reflection surface. The plurality of divided reflection surfaces internally reflect, toward the detection device side, a part of the first emission light as the monitor light. The plurality of the divided transmission surfaces allow, to pass through the plurality of the divided transmission surfaces toward the fourth optical surface side, a part of the first emission light as the signal light, or to allow, to pass through the plurality of the divided transmission surfaces toward the third optical surface side, a part of the second emission light as the reception light.

An optical module according to an embodiment of the present invention includes: a photoelectric conversion device; and the optical receptacle. The photoelectric conversion device includes a substrate, a photoelectric conversion element disposed on the substrate, and including a light emission region or a light reception region, and a detection device disposed on the substrate, and configured to monitor emission light emitted from the light emission region of the photoelectric conversion element.

A manufacturing method of the optical module according to an embodiment of the present invention includes: disposing the first optical device on the substrate of the photoelectric conversion device; positioning the first optical device such that the first optical surface is opposite to the photoelectric conversion element, and the first optical device intersects the optical axis of the first emission light emitted from the photoelectric conversion element while detecting a position of the photoelectric conversion element through the first optical surface from the second optical surface side of the first optical device disposed on the substrate; and coupling the second optical device with the first optical device positioned on the substrate by fitting the first fitting part and the second fitting part to each other.

Advantageous Effects of Invention

According to the present invention, the optical receptacle can be easily and appropriately positioned with respect to the photoelectric conversion device, and the optical module can be manufactured at low cost and in a short time.

DESCRIPTION OF EMBODIMENTS

Figure 1A:
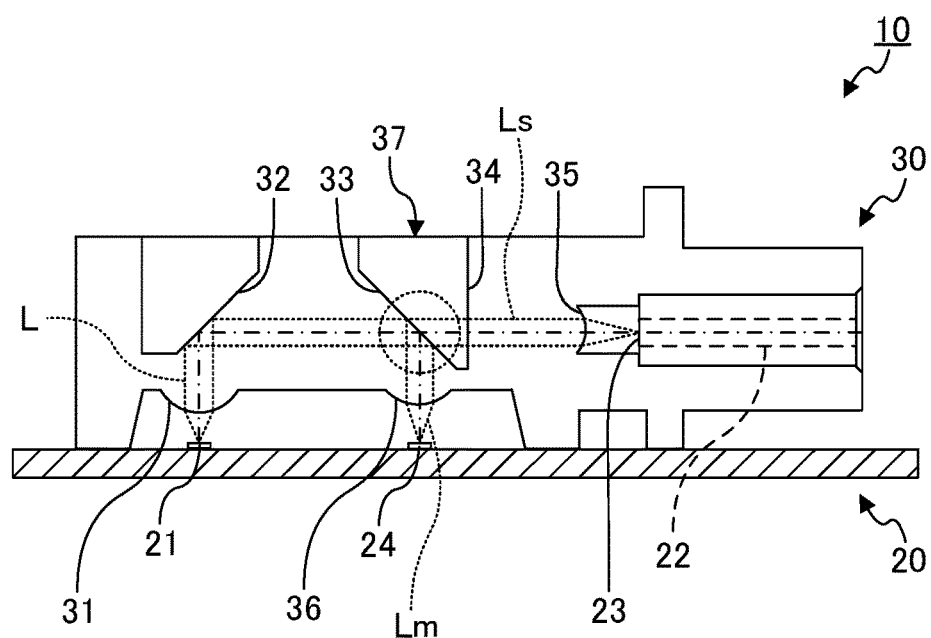
FIGS. 1A and 1B illustrate a configuration of the optical module disclosed in PTL 1.
Figure 1B:
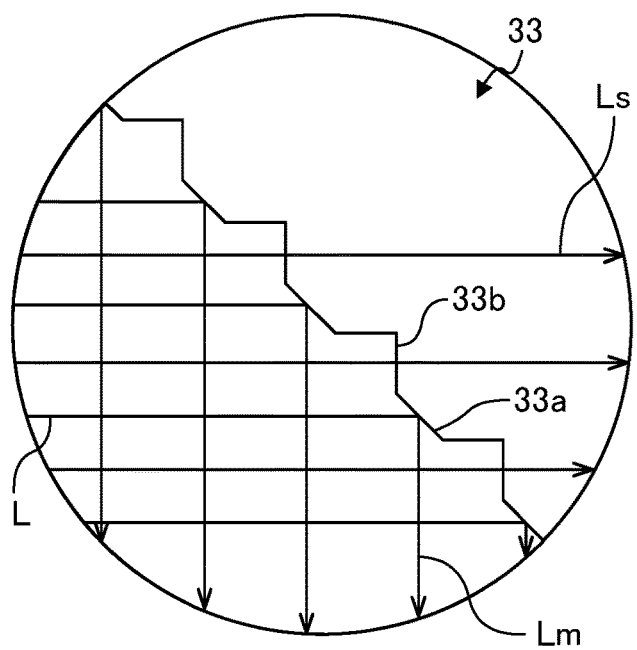
Figure 2:
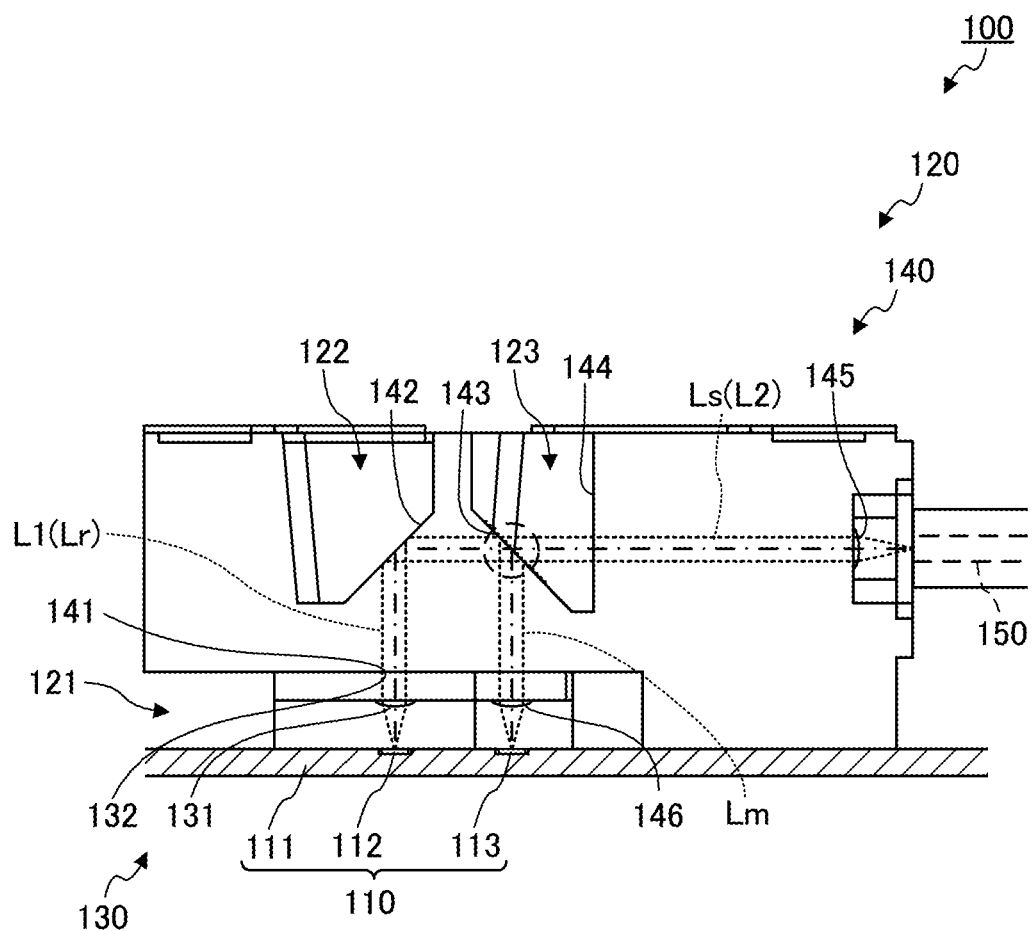
FIG. 2 is a sectional view schematically illustrating a configuration of an optical module according to an embodiment.

An embodiment of the present invention is elaborated below with reference to the accompanying drawings.
Configuration of Optical Module FIG. 2 is a sectional view schematically illustrating a configuration of optical module 100 according to the embodiment of the present invention. FIG. 2 is a sectional view taken along line A-A of FIG. 3A described later. In FIG. 2, the hatching on the cross-section of optical receptacle 120 is omitted to illustrate the light path in optical receptacle 120. In addition, in FIG. 2, the dashed line indicates an optical axis of light, and the broken line indicates an outer diameter of light.

As illustrated in FIG. 2, optical module 100 includes photoelectric conversion device 110 and optical receptacle 120. Optical module 100 according to the present embodiment is an optical module designed for reception and transmission. Optical module 100 is used with optical transmission member 150 and optical receptacle 120 connected with each other.

Photoelectric conversion device 110 includes substrate 111, photoelectric conversion element 112, detection device 113 and a control part.

Substrate 111 holds photoelectric conversion element 112, detection device 113, the control part (not illustrated in the drawing) and optical receptacle 120. In the present embodiment, substrate 111 holds the above-mentioned members in the recess formed in substrate 111. Substrate 111 is, for example, a glass composite substrate, a glass epoxy substrate, a flexible substrate or the like.

Photoelectric conversion element 112 is disposed on substrate 111, and includes a light emission region or a light reception region. In a portion that functions as a transmitting optical module, a light-emitting element is disposed on substrate 111 as photoelectric conversion element 112. On the other hand, in a portion that functions as a receiving optical module, a light-receiving element is disposed on substrate 111 as photoelectric conversion element 112. In the present embodiment, four light-emitting elements (near side) and four light-receiving elements (depth side) are arranged on a straight line along a depth direction of FIG. 2.

The light-emitting element emits laser light in a direction perpendicular to the front surface of substrate 111. To be more specific, the light-emitting element emits laser light from a light-emitting surface (light emission region). The shape of the light-emitting surface is not limited. In the present embodiment, the light-emitting surface has a circular shape. The number and the position of the light-emitting element are not limited. In the present embodiment, four light-emitting elements are provided. The four light-emitting elements are arranged in a line on substrate 111. The light-emitting element is, for example, a vertical cavity surface emitting laser (VCSEL).

The light-receiving element receives reception light Lr that has been emitted from the end surface of optical transmission member 150 and has passed through the inside of optical receptacle 120. To be more specific, the light-receiving element receives reception light Lr at a light reception surface (light reception region). The shape of the light reception surface is not limited. In the present embodiment, the light reception surface has a circular shape. The number and the position of the light-receiving element are not limited. In the present embodiment, four light-receiving elements are provided. The four light-receiving elements are arranged in a line on substrate 111. The light-receiving element is, for example, a photodiode (PD).

Detection device 113, which is disposed on substrate 111, monitors first emission light L1 emitted from the light-emitting surface (light emission region) of photoelectric conversion element 112. To be more specific, detection device 113 receives monitor light Lm, which is a part of the first emission light emitted from optical receptacle 120.

Detection device 113 is a photodiode (PD), for example. The number of detection device 113 is not limited, and may be appropriately set in accordance with the use. In the present embodiment, four detection devices 113 are provided as with the light-emitting elements. Four detection devices 113 are disposed on substrate 111 at a position where monitor light Lm can be received. In addition, in view of preventing reflection light from detection element 113 from returning to optical receptacle 120, the optical axis of monitor light Lm incident on detection element 113 may be tilted with respect to the detection surface of detection element 113.

Although not illustrated in the drawings, the control part is disposed on substrate 111, and is electrically connected with photoelectric conversion element 112 (light-emitting element) and detection device 113 through a wiring. On the basis of the intensity, the quantity and the like of monitor light Lm received at detection element 113, the control part controls the output of emission light L1 to be emitted by photoelectric conversion element 112 (light-emitting element).

Optical receptacle 120 optically couples photoelectric conversion element 112 and the end surface of optical transmission member 150 in the state where optical receptacle 120 is disposed between photoelectric conversion element 112 and optical transmission member 150. In the portion that functions as the transmitting optical module, optical receptacle 120 emits, toward the end surface of optical transmission member 150, signal light Ls, which is a part of first emission light L1 emitted from photoelectric conversion element 112 (light-emitting element). In the portion that functions as the receiving optical module, optical receptacle 120 emits, toward photoelectric conversion element 112 (light-receiving element), reception light Lr, which is a part of second emission light L2 emitted from the end surface of optical transmission member 150.

Optical receptacle 120 is elaborated later, and light is denoted herein as follows. It is to be noted that, in FIG. 2, lights that pass through the portion that functions as the receiving optical module are denoted with reference numerals in the round parentheses (L2 and Lr), and lights that pass through the portion that functions as the transmitting optical module are denoted with reference numerals with no parentheses (L1, Ls and Lm).

Here, light emitted from photoelectric conversion element (light-emitting element) 112 is referred to as "first emission light L1." First emission light L1 is light in a range from the light-emitting surface of photoelectric conversion element 112 to light separation part 143 described later. In addition, a part of first emission light L1 that is separated by light separation part 143 and emitted from optical receptacle 120 toward the end surface of optical transmission member 150 is referred to as "signal light Ls." Signal light Ls is light in the range from light separation part 143 to the end surface of optical transmission member 150. In addition, another part of first emission light L1 that is separated by light separation part 143 and emitted from optical receptacle 120 toward detection device 113 is referred to as "monitor light Lm." That is, monitor light Lm is light in a range from light separation part 143 to detection device 113. In addition, light emitted from the end surface of optical transmission member 150 is referred to as "second emission light L2." Second emission light L2 is light from the end surface of optical transmission member 150 to light separation part 143. Further, a part of second emission light L2 that is attenuated by light separation part 143 and emitted from optical receptacle 120 toward photoelectric conversion element (light-receiving element) 112 is referred to as "reception light Lr." Reception light Lr is light from light separation part 143 to the light reception surface of photoelectric conversion element 112.

Photoelectric conversion device 110 and optical receptacle 120 (first optical device 130 described later) are fixed to each other with a publicly known fixing member such as an adhesive agent (e.g. heat/ultraviolet curing resin).

Optical transmission member 150 is fixed on optical receptacle 120 with a publicly known attaching means in the state where optical transmission member 150 is housed in a multicore collective connector. The type of optical transmission member 150 is not limited. Examples of the type of optical transmission member 150 include an optical fiber, a light waveguide, and the like. In the present embodiment, optical transmission member 150 is an optical fiber. In addition, the optical fiber may be of a single mode type, or a multiple mode type. The number of optical transmission member 150 is not limited, and may be appropriately changed in accordance with the use. In the present embodiment, eight optical transmission members 150 are provided. Of the eight optical transmission members 150, four optical transmission members 150 are disposed in the portion that functions as the transmitting optical module, and the other four optical transmission members 150 are disposed in the portion that functions as the receiving optical module in optical module 100.

Configuration of Optical Receptacle

Figure 3A:
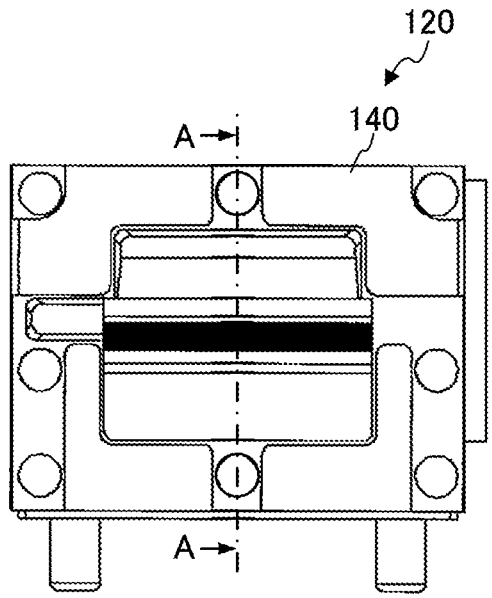
FIGS. 3A to 3E illustrate a configuration of an optical receptacle according to the embodiment.
Figure 3C:
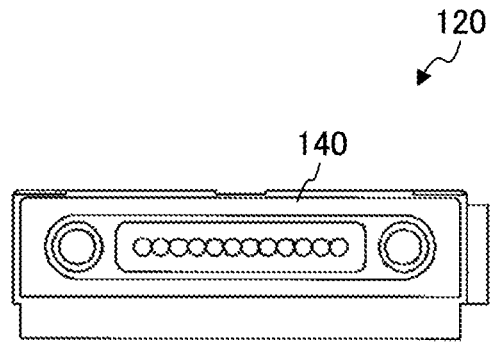
Figure 3D:
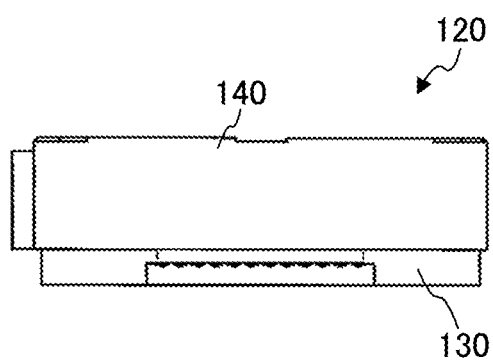
Figure 3B:
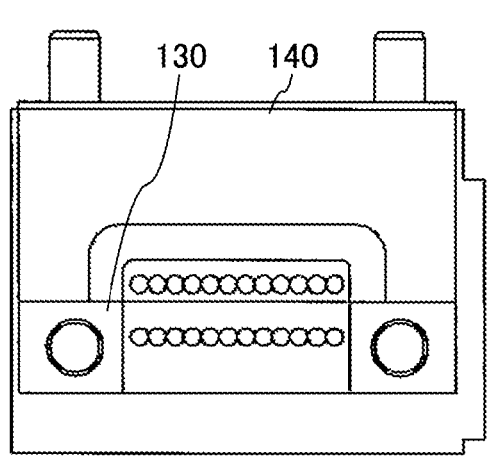
Figure 3E:
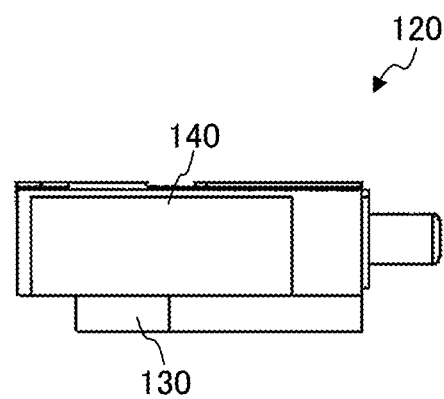

FIGS. 3A to 3E illustrate a configuration of optical receptacle 120 according to the present embodiment. FIG. 3A is a plan view of optical receptacle 120, FIG. 3B is a bottom view of optical receptacle 120, FIG. 3C is a front view of optical receptacle 120, FIG. 3D is a back view of optical receptacle 120, and FIG. 3E is a left side view of optical receptacle 120. It is to be noted that, in the following description, the surface of optical receptacle 120 on which optical transmission member 150 is connected is referred to as "front surface."

As illustrated in FIG. 2 and FIGS. 3A to 3E, optical receptacle 120 is a member having a substantially cuboid shape. In the present embodiment, first recess 121, which has a substantially rectangular prism shape and opens at the back surface of optical receptacle 120, is formed in the bottom surface of optical receptacle 120. In the top surface of optical receptacle 120, second recess 122 having a substantially pentagonal prism shape and third recess 123 having a substantially pentagonal prism shape are formed side by side in the direction from the back surface toward the front surface of optical receptacle 120.

Optical receptacle 120 includes first optical device 130 and second optical device 140. Above substrate 111, first optical device 130 is disposed opposite to photoelectric conversion element 112. Above substrate 111, second optical device 140 is disposed opposite to first optical device 130 and detection device 113.

First optical device 130 and second optical device 140 are coupled with each other through a fitting structure described later (first fitting part 133 and second fitting part 147). In view of preventing light reflection between first optical device 130 and second optical device 140, and suppressing reduction in coupling efficiency between photoelectric conversion element 112 and the end surface of optical transmission member 150, it is preferable that first optical device 130 and second optical device 140 be coupled with each other with no gap on the light path. The way of preventing formation of a gap at a position on the light path between first optical device 130 and second optical device 140 is not limited. The way may be coupling first optical device 130 and second optical device 140 by pressing first optical device 130 and second optical device 140 against each other, or disposing another member (refractive index adjusting part) for adjusting the refractive index between first optical device 130 and second optical device 140, for example. The way of disposing the refractive index adjusting part on the light path between first optical device 130 and second optical device 140 is not limited. The way may be sandwiching a resin sheet of an epoxy resin between first optical device 130 and second optical device 140, or solidifying a liquid resin placed on first optical device 130 on which second optical device 140 is disposed, for example.

Optical receptacle 120 is formed of a material that is transparent to light of a wavelength used in optical communications. Examples of such a material include inorganic materials such as glass, gallium arsenide (GaAs), gallium phosphide (GaP); and transparent resins such as polyetherimide (PEI) and cyclic olefin resin. The materials of first optical device 130 and second optical device 140 may be identical to each other or different from each other.

Figure 4A:
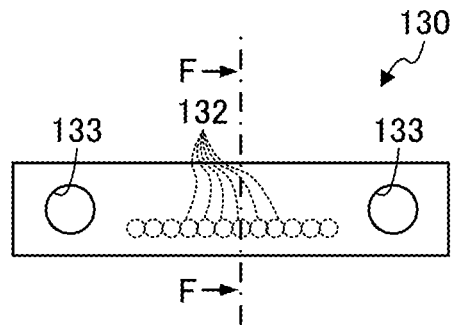
FIGS. 4A to 4F illustrate a configuration of a first optical device according to the embodiment.
Figure 4B:
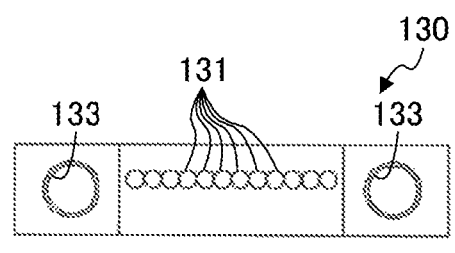
Figure 4C:
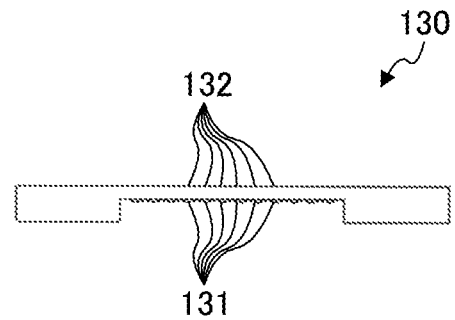
Figure 4D:
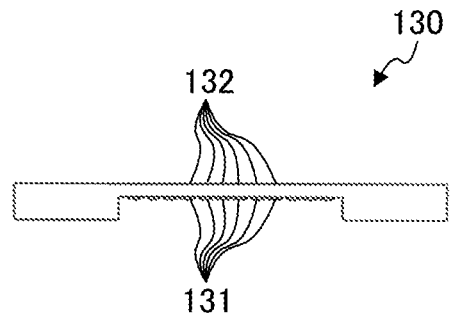
Figure 4E:
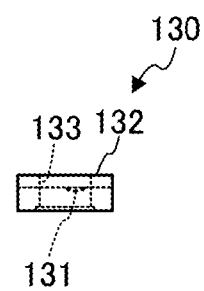
Figure 4F:
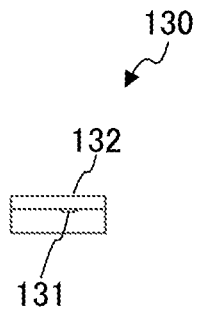

FIGS. 4A to 4F illustrate a configuration of first optical device 130 according to the present embodiment. FIG. 4A is a plan view of first optical device 130, FIG. 4B is a bottom view of first optical device 130, FIG. 4C is a front view of first optical device 130, FIG. 4D is a back view of first optical device 130, FIG. 4E is a left side view of first optical device 130, and FIG. 4F is a sectional view taken along line F-F of FIG. 4A.

First optical device 130 includes first optical surface 131, second optical surface 132 and first fitting part 133.

In the portion that functions as the transmitting optical module, first optical surface 131 allows, to enter first optical device 130, first emission light L1 emitted from photoelectric conversion element (light-emitting element) 112. At this time, first optical surface 131 allows, to enter first optical device 130, first emission light L1 emitted from the light-emitting surface (light emission region) of photoelectric conversion element 112 while refracting the light so as to convert the light into collimate light.

On the other hand, in the portion that functions as the receiving optical module, first optical surface 131 emits, toward photoelectric conversion element (light-receiving element) 112, reception light Lr, which is a part of second emission light L2 that has been emitted from the end surface of optical transmission member 150 and has passed through the inside of second optical device 140 and first optical device 130. At this time, first optical surface 131 emits reception light Lr toward the light reception surface of photoelectric conversion element 112 (light reception region) while converging reception light Lr.

The number of first optical surface 131 is not limited, and may be appropriately selected in accordance with the use. In the present embodiment, twelve first optical surfaces 131 are provided. In optical receptacle 120 according to the present embodiment in FIG. 4B, the leftmost four first optical surfaces 131 are used as transmitting first optical surfaces 131, and the rightmost four first optical surfaces 131 are used as receiving first optical surfaces 131. In the present embodiment, four first optical surfaces 131 at the center are not used.

In the bottom surface of first optical device 130, twelve first optical surfaces 131 are disposed opposite to respective photoelectric conversion elements 112. In the present embodiment, twelve first optical surfaces 131 are disposed in a line along the long side direction of first optical device 130 in the bottom surface of first recess 121 provided on the rear side (bottom surface) of first optical device 130.

The shape of first optical surface 131 may be, but not limited to, a plane shape or a curved shape. In the present embodiment, first optical surface 131 is a convex lens protruding toward photoelectric conversion element 112. In addition, the shape of first optical surface 131 in plan view is a circular shape. Preferably, the central axis of first optical surface 131 is perpendicular to the light-emitting surface or the light-receiving surface of photoelectric conversion element 112 (and the surface of substrate 111). In addition, preferably, the central axis of first optical surface 131 coincides with the optical axis of first emission light L1 emitted from photoelectric conversion element 112 (light-emitting element), or the optical axis of reception light Lr incident on photoelectric conversion element 112 (light-receiving element).

In the portion that functions as the transmitting optical module, second optical surface 132 emits, toward second optical device 140, first emission light L1 emitted from photoelectric conversion element (light-emitting element) 112. Here, preferably, second optical surface 132 is perpendicular to first emission light L1 incident on second optical surface 132. With this configuration, first emission light L1 can be emitted with no refraction of first emission light L1, and with almost no reflection of first emission light L1.

On the other hand, in the portion that functions as the receiving optical module, second optical surface 132 allows, to enter first optical device 130, reception light Lr that has been emitted from the end surface of optical transmission member 150 and has passed through the inside of second optical device 140. Here, preferably, second optical surface 132 is perpendicular to reception light Lr incident on second optical surface 132. With this configuration, it is possible to allow reception light Lr to enter first optical device 130 with no refraction of reception light Lr, and with almost no reflection of reception light Lr.

The number of second optical surface 132 is not limited, and may be appropriately selected in accordance with the use. In the present embodiment, twelve second optical surfaces 132 are provided. In optical receptacle 120 according to the present embodiment in FIG. 4A, the leftmost four second optical surfaces 132 are used as transmitting second optical surfaces 132, the rightmost four second optical surfaces 132 are used as receiving second optical surfaces 132. In the present embodiment, the four second optical surfaces 132 at the center are not used. In the top surface of first optical device 130, the twelve second optical surfaces 132 are disposed opposite to third optical surfaces 141 (described later) of second optical device 140.

The shape of second optical surface 132 may be, but not limited to, a plane shape or a curved shape. In the present embodiment, second optical surface 132 has a plane shape. Second optical surface 132 with a plane shape is preferable in view of achieving a low manufacturing cost.

First fitting part 133 is fitted to second fitting part 147 described later. With this configuration, first optical device 130 and second optical device 140 are positioned and coupled to each other. The position of first fitting part 133 is not limited as long as the position is opposite to second fitting part 147 (described later) and is located in a surface different from the surface (in the present embodiment, the bottom surface) opposite to substrate 111. In the present embodiment, first fitting part 133 is disposed in the top surface that is the surface including second optical surface 132 of first optical device 130. The arrangement, shape, size, and number of first fitting part 133 are not limited as long as first optical device 130 and second optical device 140 are appropriately coupled with each other, and the arrangement, shape, size, and number of first fitting part 133 correspond to those of second fitting part 147. Examples of the shape of first fitting part 133 include a recessed shape, a protruding shape and a through-hole shape. Examples of the shape of first fitting part 133 in plan view include a circular shape, an elliptical shape, a quadrangular shape and a polygonal shape. In the present embodiment, first fitting part 133 is two through holes each having a circular shape in plan view.

Figure 5A:
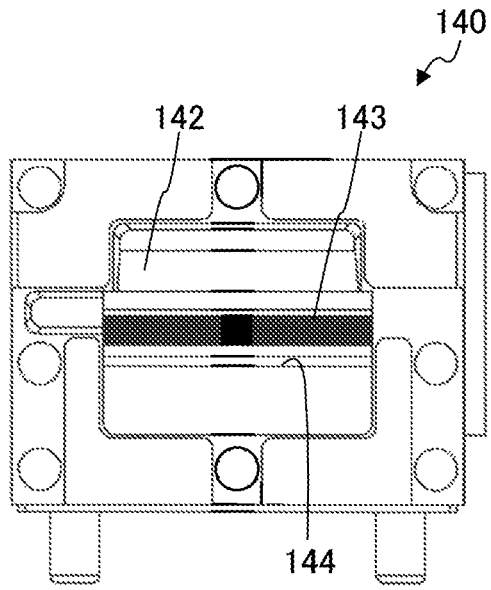
FIGS. 5A to 5E illustrate a configuration of a second optical device according to the embodiment.
Figure 5C:
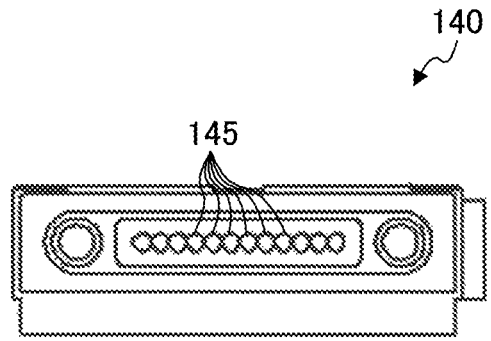
Figure 5D:
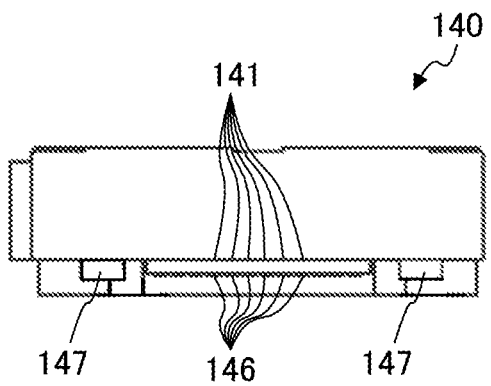
Figure 5B:
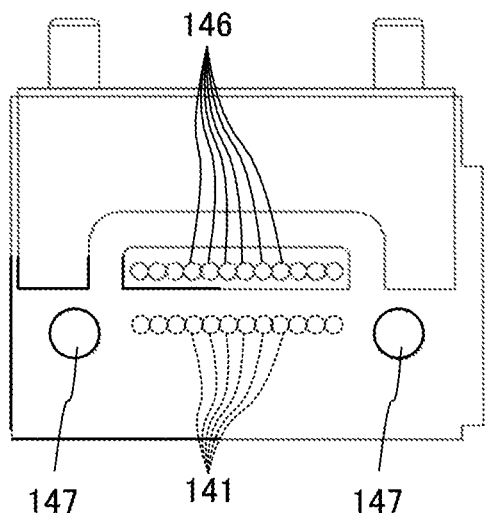
Figure 5E:
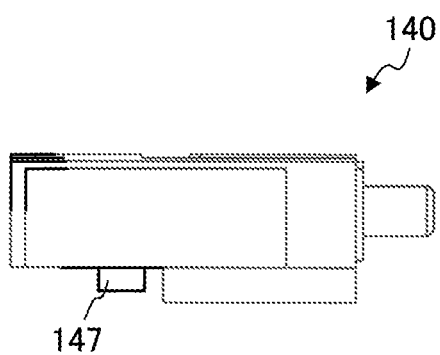

FIGS. 5A to 5E illustrate a configuration of second optical device 140 according to the present embodiment. FIG. 5A is a plan view of second optical device 140, FIG. 5B is a bottom view of second optical device 140, FIG. 5C is a front view of second optical device 140, FIG. 5D is a back view of second optical device 140, and FIG. 5E is a left side view of second optical device 140.

Second optical device 140 includes third optical surface 141, reflection surface 142, light separation part 143, transmission surface 144, fourth optical surface 145, fifth optical surface 146 and second fitting part 147.

In the portion that functions as the transmitting optical module, third optical surface 141 allows, to enter second optical device 140, first emission light L1 that has been emitted from photoelectric conversion element 112 and has passed through the inside of first optical device 130. Here, preferably, third optical surface 141 is perpendicular to first emission light L1 incident on third optical surface 141. With this configuration, it is possible to allow first emission light L1 to enter second optical device 140 with no refraction of first emission light L1, and with almost no reflection of first emission light L1.

On the other hand, in the portion that functions as the receiving optical module, third optical surface 141 emits, toward second optical surface 132 of first optical device 130, reception light Lr that has passed through the inside of second optical device 140. Here, preferably, third optical surface 141 is perpendicular to reception light Lr incident on third optical surface 141. With this configuration, it is possible to emit reception light Lr with no refraction of reception light Lr, and with almost no reflection of reception light Lr.

The number of third optical surface 141 is not limited, and may be appropriately selected in accordance with the use. In the present embodiment, twelve third optical surfaces 141 are provided. In optical receptacle 120 according to the present embodiment in FIG. 5B, the leftmost four third optical surfaces 141 are used as third optical surface 141 for transmission, and the rightmost four third optical surfaces 141 are used as third optical surfaces 141 for reception. In the present embodiment, four third optical surfaces 141 at the center are not used. In the bottom surface of second optical device 140, twelve third optical surfaces 141 are disposed opposite to respective second optical surfaces 132 of first optical device 130.

The shape of third optical surface 141 may be, but not limited to, a plane shape or a curved shape. In the present embodiment, third optical surface 141 has a plane shape. Third optical surface 141 with a plane shape is preferable in view of achieving a low manufacturing cost.

In the portion that functions as the transmitting optical module, reflection surface 142 reflects, toward fourth optical surface 145, first emission light L1 having entered second optical device 140 from third optical surface 141. On the other hand, in the portion that functions as the receiving optical module, reflection surface 142 reflects, toward third optical surface 141, reception light Lr having entered second optical surface 140 from fourth optical surface 145.

Reflection surface 142 is a part of the inner surface of second recess 122. Reflection surface 142 is tilted such that the distance to fourth optical surface 145 (the front surface of optical receptacle 120) decreases from the bottom surface toward the top surface of second optical device 140. The present inclination angle of reflection surface 142 is not limited. In the present embodiment, the inclination angle of reflection surface 142 is 45° with respect to the optical axis of light incident on reflection surface 142 (first emission light L1 and reception light Lr). The shape of reflection surface 142 is not limited. In the present embodiment, reflection surface 142 has a plane shape. Incident light (first emission light L1 and reception light Lr) strikes reflection surface 142 at an incident angle greater than the critical angle.

In the portion that functions as the transmitting optical module, light separation part 143 separates, into monitor light Lm directed toward detection device 113 and signal light Ls directed toward the end surface of optical transmission member 150, first emission light L1 having entered second optical device 140 from third optical surface 141 and reflected by reflection surface 142.

In the portion that functions as the receiving optical module, light separation part 143 allows, to advance toward third optical surface 141 side, reception light Lr that is a part of second emission light L2 having entered second optical device 140 from fourth optical surface 145.

Light separation part 143 is disposed on a light path between third optical surface 141 and fourth optical surface 145. Light separation part 143 is a part of the inner surface of third recess 123.

Figure 6A:
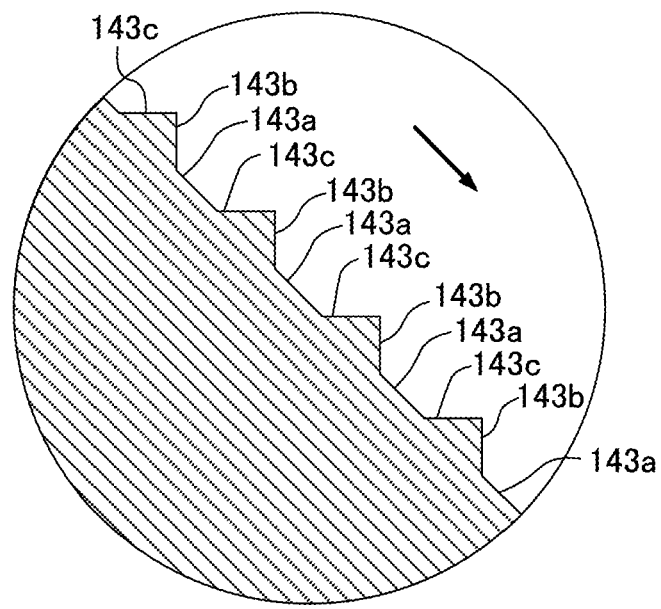
FIGS. 6A and 6B illustrate a configuration of a light separation part of the second optical device according to the embodiment.
Figure 6B:
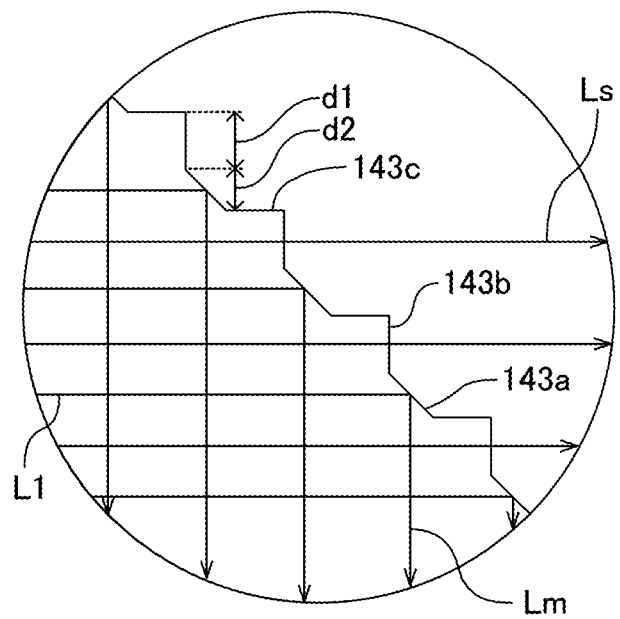

FIGS. 6A and 6B illustrate a configuration of light separation part 143 of second optical device 140 according to the present embodiment. FIG. 6A is a partially enlarged sectional view of the region indicated with the broken line in FIG. 2, and FIG. 6B is a partially enlarged sectional view illustrating light paths of second optical device 140 in a region around light separation part 143. In FIG. 6B, the hatching on the cross-section of second optical device 140 is omitted to illustrate the light paths in second optical device 140.

Light separation part 143 includes a plurality of divided reflection surfaces 143a, a plurality of divided transmission surfaces 143b, and a plurality of divided step surfaces 143c. Divided reflection surfaces 143a alternate with divided transmission surfaces 143b along the inclination direction of divided reflection surface 143a (see the arrow illustrated in FIG. 6A).

In the portion that functions as the transmitting optical module, divided reflection surface 143a internally reflects, toward fifth optical surface 146 (detection device 113 side), a part of first emission light L1 as monitor light Lm. Divided reflection surface 143a is an inclined surface with respect to the optical axis of first emission light L1. In the present embodiment, divided reflection surface 143a is tilted such that the distance to fourth optical surface 145 (the front surface of optical receptacle 120) decreases from the top surface toward the bottom surface of optical receptacle 120 (second optical device 140). The inclination angle of divided reflection surface 143a is 45° with respect to the optical axis of first emission light L1. Divided reflection surfaces 143a are divided in the inclination direction of divided reflection surfaces 143a, and are disposed at a predetermined interval.

Divided reflection surfaces 143a are disposed on one plane.

In the portion that functions as the transmitting optical module, divided transmission surface 143b allows a part of first emission light L1 to pass therethrough toward fourth optical surface 145 side as signal light Ls.

On the other hand, in the portion that functions as the receiving optical module, divided transmission surface 143b allows a part of second emission light L2 to pass therethrough toward third optical surface 141 side (in the present embodiment, reflection surface 142) as reception light Lr.

Divided transmission surface 143b is a surface perpendicular to the optical axes of first emission light L1 and second emission light L2. Divided transmission surfaces 143b are divided in the inclination direction of divided reflection surface 143a and are disposed at a predetermined interval. Divided transmission surfaces 143b are parallel to each other.

Divided step surface 143c is a surface parallel to the optical axes of first emission light L1 and second incident light L2, and connects between divided reflection surface 143a and divided transmission surface 143b. Also, divided step surfaces 143c are disposed in the inclination direction of divided reflection surface 143a at a predetermined interval. Divided step surfaces 143c are parallel to each other.

As illustrated in FIG. 6A, divided reflection surface 143a, divided step surface 143c and divided transmission surface 143b are arranged in the named order along the direction from the top surface toward the bottom surface. The smaller angle of the angles between divided reflection surface 143a and divided transmission surface 143b is 135°. Also, the smaller angle between divided reflection surface 143a and divided step surface 143c is 135°.

Now light separation at light separation part 143 is described.

As illustrated in FIG. 6B, in the portion that functions as the transmitting optical module, a part of first emission light L1 reflected by reflection surface 142 is internally incident on divided reflection surface 143a at an incident angle greater than the critical angle. Divided reflection surface 143a internally reflects, toward fifth optical surface 146 (detection device 113 side), a part of first emission light L1, thereby generating monitor light Lm. In addition, a remaining part of first emission light L1 is incident on divided transmission surface 143b. Divided transmission surface 143b allows a remaining part of first emission light L1 to pass therethrough, thereby generating signal light Ls directed toward fourth optical surface 145 (the end surface of optical transmission member 150). At this time, since divided transmission surface 143b is perpendicular to incident first emission light L1, divided transmission surface 143b does not refract signal light Ls. It is to be noted that, since divided step surface 143*c* is parallel to the incident direction of first emission light L1, first emission light L1 does not incident on divided step surface 143*c*.

The light quantity ratio between signal light Ls and monitor light Lm is not limited as long as monitor light Lm capable of monitoring the intensity and/or the quantity of first emission light L1 emitted from photoelectric conversion element (light-emitting element) 112, and signal light Ls of a desired quantity can be obtained. The light quantity ratio between signal light Ls and monitor light Lm is approximately equal to the area ratio between divided transmission surface 143*b* and divided reflection surface 143*a* in light separation part 143 viewed from reflection surface 142 side. Accordingly, the light quantity ratio between signal light Ls and monitor light Lm can be adjusted by changing the area ratio (see d1 and d2 of FIG. 6B) between divided transmission surface 143*b* and divided reflection surface 143*a* in light separation part 143 viewed from reflection surface 142 side. Preferably, the light quantity ratio of signal light Ls to monitor light Lm is 5:5 to 9:1, more preferably, 7:3. In the present embodiment, the ratio of signal light Ls to monitor light Lm is 8:2.

Transmission surface 144 allows, to re-enter second optical device 140, signal light Ls separated by light separation part 143 and emitted out of second optical device 140.

Transmission surface 144 is a part of the inner surface of third recess 123.

Preferably, transmission surface 144 is a surface perpendicular to signal light Ls separated by light separation part 143. With this configuration, signal light Ls travelling toward the end surface of optical transmission member 150 can be allowed to enter second optical device 140 without being refracted. In addition, transmission surface 144 may be a surface tilted with respect to the optical axis of signal light Ls separated by light separation part 143. In this case, transmission surface 144 is tilted such that the distance to fourth optical surface 145 decreases from the bottom surface toward the top surface of optical receptacle 120 (second optical device 140). The inclination angle of transmission surface 144 that is a tilted surface is not limited, but preferably is an inclination angle corresponding to a releasing taper for releasing in injection molding.

In the portion that functions as the transmitting optical module, fourth optical surface 145 emits, toward the end surface of optical transmission member 150, signal light Ls that is a part of first emission light L1 and has passed through the inside of first optical device 130 and second optical device 140. At this time, fourth optical surface 145 emits signal light Ls toward the end surface of optical transmission member 150 while converging signal light Ls.

In the portion that functions as the receiving optical module, fourth optical surface 145 allows, to enter second optical device 140, second emission light L2 emitted from the end surface of optical transmission member 150. At this time, fourth optical surface 145 allows, to enter second optical device 140, second emission light L2 emitted from the end surface of optical transmission member 150 while refracting the light to convert the light into collimate light.

The number of fourth optical surface 145 is not limited, and may be appropriately selected in accordance with the use. In the present embodiment, twelve fourth optical surfaces 145 are provided. In optical receptacle 120 according to the present embodiment in FIG. 5C, the leftmost four fourth optical surfaces 145 are used as transmitting fourth optical surfaces 145, and the rightmost four fourth optical surfaces 145 are used as receiving fourth optical surfaces 145. In the present embodiment, four fourth optical surfaces 145 at the center are not used. In the front surface of second optical device 140, twelve fourth optical surfaces 145 are disposed opposite to the end surfaces of respective optical transmission members 150.

The shape of fourth optical surface 145 may be, but not limited to, a plane shape, or a curved shape. In the present embodiment, the shape of fourth optical surface 145 is a convex lens protruding toward the end surface of optical transmission member 150. Fourth optical surface 145 has a circular shape in plan view. Preferably, the central axis of fourth optical surface 145 is perpendicular to the end surface of optical transmission member 150.

Fifth optical surface 146 emits, toward detection device 113, monitor light Lm separated by light separation part 143. At this time, fifth optical surface 146 emits monitor light Lm toward detection device 113 while converging monitor light Lm.

The number of fifth optical surface 146 is not limited, and may be appropriately selected in accordance with the use. In the present embodiment, twelve fifth optical surfaces 146 are provided. In optical receptacle 120 according to the present embodiment in FIG. 5B, the leftmost four fifth optical surfaces 146 are used for emitting monitor light Lm toward detection device 113. The remaining eight fifth optical surfaces 146 on the right side are not used. Twelve fifth optical surfaces 146 are disposed opposite to respective detection devices 113 in the bottom surface of second optical device 140.

In the present embodiment, fifth optical surface 146 is a convex lens protruding toward detection device 113. As described above, preferably, the central axis of fifth optical surface 146 is tilted with respect to the detection surface of detection device 113 in view of preventing the reflection light from detection device 113 from returning into optical receptacle 120 (second optical device 140).

Second fitting parts 147 are fitted to first fitting parts 133. In this manner, first optical device 130 and second optical device 140 are positioned and coupled to each other. The position of second fitting part 147 is not limited as long as the position is located opposite to first fitting part 133 in a surface different from the surface (in the present embodiment, the front surface) opposite to the end surface of optical transmission member 150. In the present embodiment, second fitting part 147 is disposed in the bottom surface including third optical surface 141 of second optical device 140. The arrangement, shape, size, and number of second fitting part 147 correspond to those of first fitting part 133, and are not limited as long as first optical device 130 and second optical device 140 are appropriately coupled with each other. Examples of the shape of second fitting part 147 include a recessed shape, a protruding shape and a through-hole shape. Examples of the shape of second fitting part 147 in plan view include a circular shape, an elliptical shape, a quadrangular shape and a polygonal shape. In the present embodiment, second fitting part 147 is two protrusions each having a circular shape in plan view.

Light Paths in Optical Module

Next, light paths in optical module 100 are described.

In the portion that functions as the transmitting optical module, first emission light L1 emitted from photoelectric conversion element 112 (light-emitting element) enters first optical device 130 from first optical surface 131. At this time, first emission light L1 is converted to collimate light by first optical surface 131. Next, first emission light L1 having entered first optical device 130 from first optical surface 131 is emitted out of first optical device 130 from second optical surface 132, and enters second optical device 140 from third optical surface 141. At this time, first emission light L1 has been converted to collimate light, and is incident on second optical surface 132 and third optical surface 141 at an angle approximately perpendicular to second optical surface 132 and third optical surface 141. Accordingly, first emission light L1 is not refracted, while being transmitted from first optical device 130 to second optical device 140 with almost no reflection. First emission light L1 having entered second optical device 140 from third optical surface 141 is reflected by reflection surface 132 toward light separation part 143. A part of first emission light L1 reaching light separation part 143 is internally reflected by divided reflection surface 143a toward fifth optical surface 146 and becomes monitor light Lm. Monitor light Lm is emitted out of second optical device 140 from fifth optical surface 146, and reaches the detection surface of detection device 113. On the other hand, a remaining part of first emission light L1 reaching light separation part 143 passes through divided transmission surface 143b while being emitted out of second optical device 140, and becomes signal light Ls. Next, signal light Ls again enters second optical device 140 from transmission surface 144, and reaches fourth optical surface 145. Signal light Ls reaching fourth optical surface 145 is emitted out of second optical device 140 from fourth optical surface 145, and reaches the end surface of optical transmission member 150.

On the other hand, in the portion that functions as the receiving optical module, second emission light L2 emitted from the end surface of optical transmission member 150 enters second optical device 140 from fourth optical surface 145. At this time, second emission light L2 is converted to collimate light by fourth optical surface 145. Next, second emission light L2 having entered second optical device 140 from fourth optical surface 145 passes through transmission surface 144 while being emitted out of second optical device 140. Next, a part of second emission light L2 emitted out of second optical device 140 passes through divided transmission surface 143b of light separation part 143 while re-entering second optical device 140, and becomes reception light Lr. Next, reception light Lr is reflected by reflection surface 142 toward third optical surface 141. Next, reception light Lr reaching third optical surface 141 is emitted out of second optical device 140 from third optical surface 141, and enters first optical device 130 from second optical surface 132. At this time, reception light Lr has been converted to collimate light, and is incident on third optical surface 141 and second optical surface 132 at an angle approximately perpendicular to third optical surface 141 and second optical surface 132. Accordingly, reception light Lr is not refracted, and is transmitted from second optical device 140 to first optical device 130 with almost no reflection. Reception light Lr having entered first optical device 130 from second optical surface 132 is emitted out of first optical device 130 from first optical surface 131, and reaches photoelectric conversion element 120 (light-receiving element).

In the above-mentioned manner, optical receptacle 120 according to the present embodiment can optically couple photoelectric conversion element 112 and the end surface of optical transmission member 150 in an appropriate manner.

Manufacturing Method of Optical Module

Figure 7A:
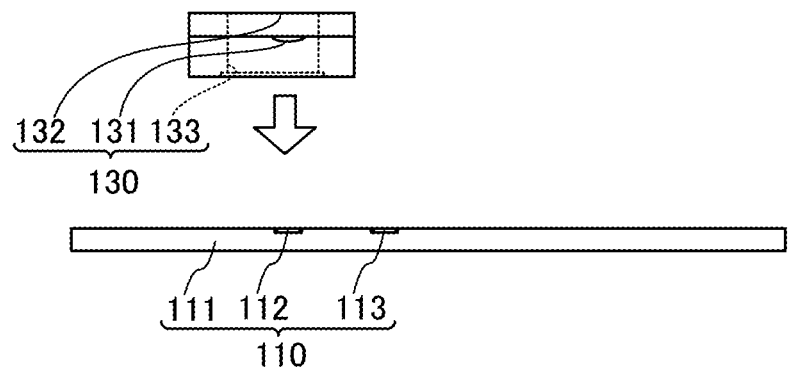
FIGS. 7A to 7C are schematic cross-sectional views for describing a manufacturing method of the optical module according to the embodiment.
Figure 7B:
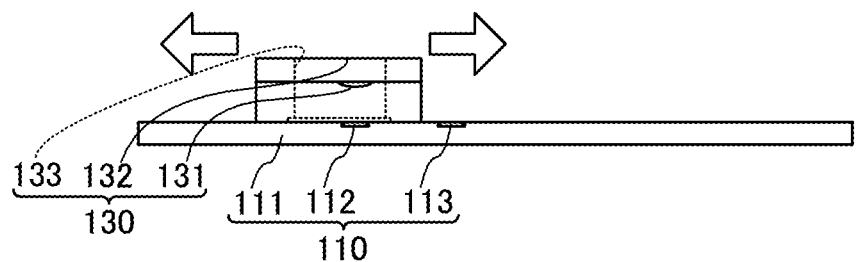
Figure 7C:
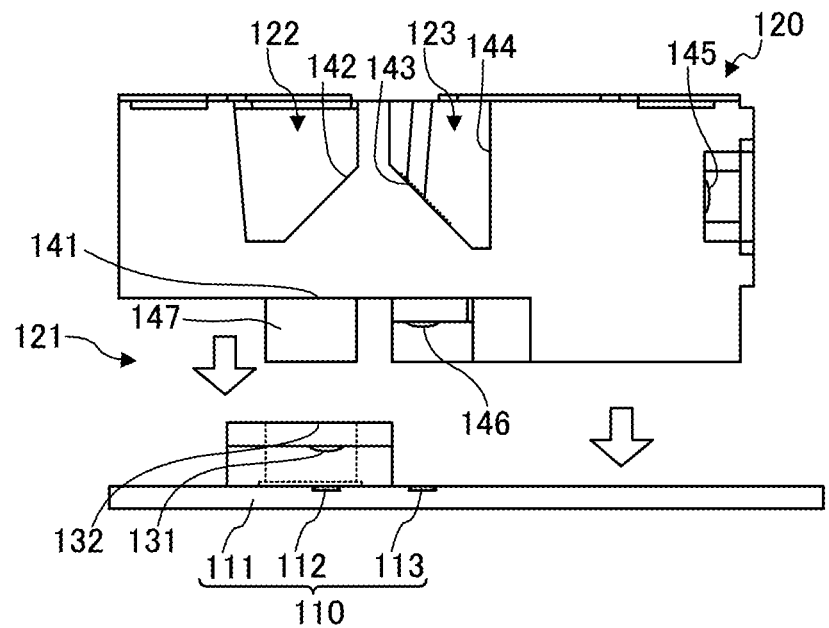

Next, a manufacturing method of optical module 100 according to the present embodiment is described. FIGS. 7A to 7C are schematic cross-sectional views for describing the manufacturing method of optical module 100 according to the present embodiment. It is to be noted that, in FIGS. 7A to 7C, the hatching on the cross-section of the members is omitted.

As illustrated in FIGS. 7A to 7C, the manufacturing method of optical module 100 according to the present embodiment includes a step of disposing first optical device 130 on substrate 111 of photoelectric conversion device 110 (step S10), a step of positioning first optical device 130 disposed on substrate 111 (step S20), and a step of coupling second optical device 140 and first optical device 130 positioned on substrate 111 (step S30).

1. Step S10

First, as illustrated in FIG. 7A, first optical device 130 is disposed on substrate 111 of photoelectric conversion device 110. To be more specific, first, photoelectric conversion device 110 including photoelectric conversion element 112 (a light-emitting element and a light-receiving element), detection device 113, a control part, an integrated circuit (IC) and the like, which are disposed on a surface of substrate 111, is prepared. Photoelectric conversion device 110 may be a ready-made product, for example. In addition, first optical device 130 is prepared. First optical device 130 may be manufactured by a publicly known method such as injection molding and pressing, for example. Next, first optical device 130 is disposed on substrate 111 of prepared photoelectric conversion device 110 such that first optical surface 131 of first optical device 130 is opposite to the front surface of substrate 111.

2. Step S20 Next, as illustrated in FIG. 7B, first optical device 130 disposed on substrate 111 is positioned. To be more specific, while detecting the position of photoelectric conversion element 112 through second optical surface 132 and first optical surface 131 from second optical surface 132 side of first optical device 130 disposed on substrate 111, first optical device 130 is positioned such that one or more first optical surfaces 131 respectively opposite to one or more photoelectric conversion elements 112, and respectively intersect the optical axes of first emission light L1 emitted from one or more photoelectric conversion elements 112.

At this time, it is preferable to position first optical device 130 such that first optical surface 131 is opposite to the light-emitting surface of photoelectric conversion element 112 (light-emitting element) and matches the optical axis of first emission light L1 emitted from photoelectric conversion element 112.

Next, in the state where first optical device 130 is positioned on substrate 111, first optical device 130 is fixed on substrate 111. It suffices that first optical device 130 is fixed with a publicly known fixing means such as an adhesive agent (e.g. heat/ultraviolet curable resin), for example.

3. Step S30

Next, second optical device 140 and first optical device 130 positioned on substrate 111 are coupled with each other. To be more specific, first fitting part 133 and second fitting part 147 are fitted to each other to couple first optical device 130 with second optical device 140. In this manner, second optical device 140 can be disposed on substrate 111 such that second optical device 140 is opposite to first optical device 130 and detection device 113. At this time, second optical device 140 is disposed on substrate 111 such that second optical surface 132 of first optical device 130 and third optical surface 141 of second optical device 140 are opposite to each other.

At this time, preferably, first optical device 130 and second optical device 140 are coupled with each other while being pressed against each other such that second optical surface 132 and third optical surface 141 are in contact with each other. In this manner, it is possible to prevent formation of a gap on the light path between first optical device 130 and second optical device 140. As a result, in optical module 100, it is possible to prevent reflection of light (first emission light L1 and reception light Lr) between first optical device 130 and second optical device 140, and it is possible to suppress reduction of the coupling efficiency between photoelectric conversion element 112 and the end surface of optical transmission member 150.

In the above-mentioned manner, optical module 100 according to the present embodiment can be manufactured. In addition, the manufacturing method of optical module 100 according to the present embodiment may include other steps as necessary.

Figure 8:
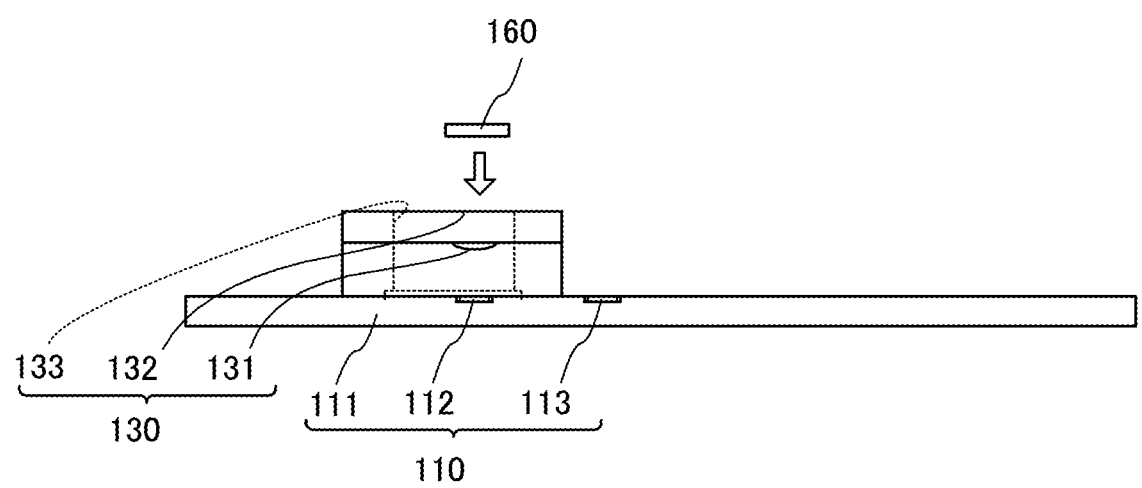
FIG. 8 is a schematic cross-sectional view for describing a step which may be included in the manufacturing method of the optical module according to the embodiment.

FIG. 8 is a schematic cross-sectional view for describing a step which may be included in the manufacturing method of optical module 100 according to the present embodiment. For example, the manufacturing method of optical module 100 may include a step of providing refractive index adjusting part 160 on second optical surface 132 for the purpose of providing a refractive index adjusting part whose refractive index is closer to that of first optical device 130 or second optical device 140 than that of air at a portion between second optical surface 132 and third optical surface 141 (see FIG. 8). For example, as refractive index adjusting part 160, a resin sheet or a liquid resin for adjusting the refractive index may be disposed on first optical device 130 (second optical surface 132) before step S30, or a liquid resin for adjusting the refractive index may be poured between first optical device 130 (second optical surface 132) and second optical device 140 (third optical surface 141) as refractive index adjusting part 160 after step S30.

In addition, the manufacturing method of optical module 100 may further include a reflow step for soldering to substrate 111. In this case, in the case where first optical device 130 is made of glass, first optical device 130 does not melted in the reflow step, and therefore the reflow step may be performed after the step of disposing first optical device 130 on substrate 111 (step S10) and the positioning step (step S20).

Tolerance Width

Next, the tolerance width for positional displacement of components in optical module 100 is described. Here, "tolerance width" means an acceptable amount of the positional displacement between components for maintaining reduction of the coupling efficiency of photoelectric conversion element 112 and the end surface of optical transmission member 150 within a predetermined range when photoelectric conversion device 110, first optical device 130, second optical device 140 and optical transmission member 150 are connected to each other. In addition, "positional displacement" means a positional displacement with respect to a reference position where the coupling efficiency is maximized. While the reduction amount of the coupling efficiency may be appropriately set in accordance with the use, a tolerance width for maintaining the reduction of the coupling efficiency due to the positional displacement within 1 dB was evaluated through a simulation in the present embodiment.

In the present embodiment, evaluations were made on the tolerance width for positional displacement of first emission light L1 of first optical device 130 and photoelectric conversion device 110 in the direction perpendicular to the optical axis (hereinafter referred to simply as "tolerance width A"), the tolerance width for positional displacement of first optical device 130 and second optical device 140 in the direction perpendicular to the fitting direction (hereinafter referred to simply as "tolerance width B"), and the tolerance width for positional displacement of optical transmission member 150 and second optical device 140 in the direction perpendicular to the optical axis of second emission light L2 (hereinafter referred to simply as "tolerance width C").

Tolerance width A was evaluated by calculating the coupling efficiency while changing the relative position between photoelectric conversion device 110 and optical receptacle 120 in the direction perpendicular to the optical axis of first emission light L1.

Tolerance width B was evaluated by calculating the coupling efficiency while changing the relative position between second optical device 140 and first optical device 130 positioned on photoelectric conversion device 100.

Tolerance width C was evaluated by calculating the coupling efficiency while changing the relative position between optical transmission member 150 and optical receptacle 120 disposed on photoelectric conversion device 100.

With respect to the maximum value of the calculated coupling efficiency as a reference, the positional displacement amount when the reduction amount of the coupling efficiency is greater than 1.0 dB was evaluated as tolerance widths A to C. It is to be noted that, in this simulation, photoelectric conversion element 112 was a VCSEL in which a numerical aperture (NA) is 0.28, a light-emitting surface has a diameter of 10 µm, and the wavelength of first emission light L1 is 850 nm. Optical transmission member 150 was an optical fiber in which the numerical aperture (NA) is 0.2, and the diameter of the end surface is 50 µm.

Figure 9:
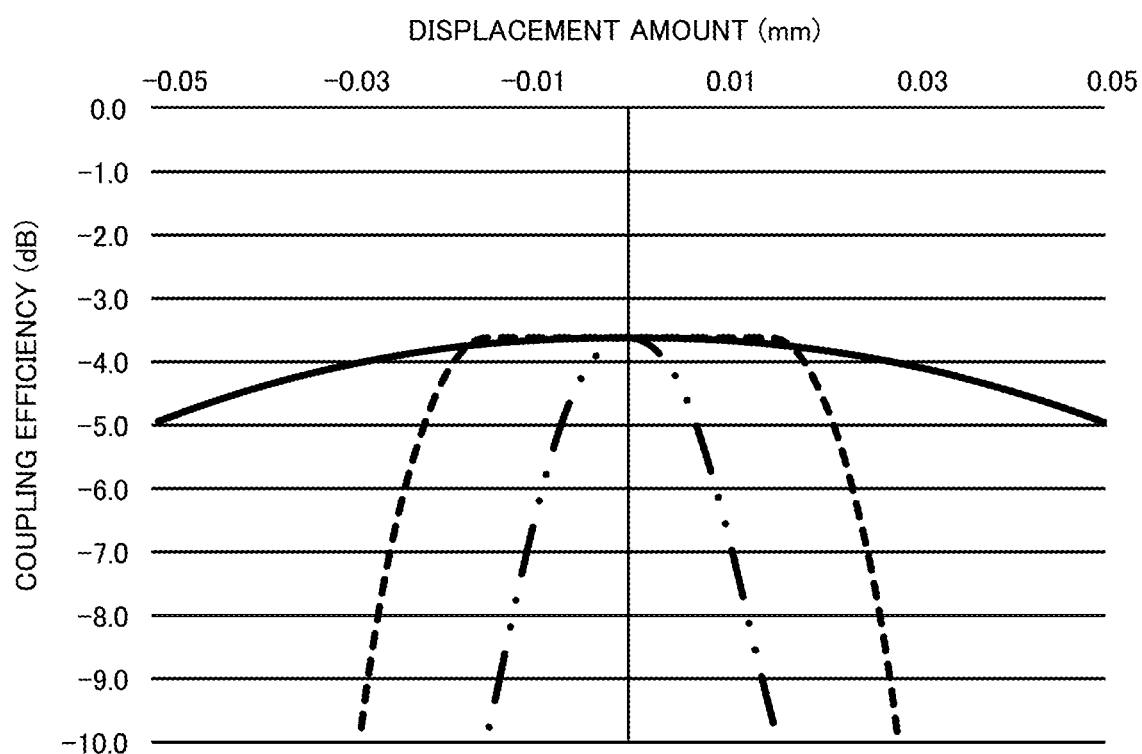
FIG. 9 is a graph showing a relationship between the coupling efficiency and the positional displacement amount of the components in the optical module.

FIG. 9 is a graph showing a relationship between the coupling efficiency and the positional displacement amount of each component in optical module 100. In FIG. 9, the abscissa indicates the positional displacement amount (mm) of each component, and the ordinate indicates the coupling efficiency (dB) of photoelectric conversion element 112 and the end surface of optical transmission member 150. The solid line indicates resulting evaluations on tolerance width B, the double-dashed chain line indicates resulting evaluations on tolerance width A, and the broken line indicates resulting evaluations on tolerance width C.

As illustrated in FIG. 9, tolerance width A was ±6 µm (see the double-dashed chain line), tolerance width B was ±40 µm (see the solid line), and the tolerance width C was ±20 µm (see the broken line). It can be said that tolerance width B is greater than tolerance widths A and C (B>C>A). It is to be noted that the positional accuracy (change in relative position of first optical device 130 and second optical device 140) of fitting of first fitting part 133 and second fitting part 147 is far smaller than tolerance width B. It is understood from the simulation result that at the time of manufacturing of optical module 100 according to the present embodiment, the positional accuracy required for coupling first optical device 130 and second optical device 140 may be lower than the positional accuracy required for positioning optical receptacle 120 with respect to photoelectric conversion element 112, and the positional accuracy required for connecting optical transmission member 150 with respect to optical receptacle 120. That is, the influence of the positional displacement of first optical device 130 and second optical device 140 on the optical characteristics (coupling efficiency) of optical receptacle 120 is also smallest.

Thus, in the manufacturing method of optical module 100 according to the present embodiment, first optical device 130 and second optical device 140 are only mechanically fitted to each other with a fitting structure, but the optical performance (coupling efficiency) of optical receptacle 120 is not degraded even when the positional accuracy is not high since tolerance width B for positional displacement is large.

Effect

As described above, in the manufacturing of an optical module including an optical receptacle having a conventional light separation part, when the optical receptacle is positioned with respect to the photoelectric conversion device by detecting the image of the photoelectric conversion element through the optical receptacle, the image of the photoelectric conversion element cannot be appropriately detected with the divided reflection surface of the light separation part, and consequently the positioning might not be achieved in some situation. In view of this, in the manufacturing of an optical module including an optical receptacle having a light separation part, positioning of the optical receptacle with respect to the photoelectric conversion device has to be performed in such a manner that light is actually emitted from the photoelectric conversion element in the state where the light receiving device is mounted to the optical module optical through the transmission member, and positioning is performed based on the coupling efficiency of the photoelectric conversion element and the end surface of the optical transmission member (active positioning). That is, the positioning of the photoelectric conversion device and the optical receptacle has to be performed at expense in time and manpower.

In contrast, optical receptacle 120 according to the present embodiment is divided into first optical device 130, and second optical device 140 including light separation part 143. In the manufacturing method of optical module 100 according to the present embodiment, second optical device 140 and first optical device 130 positioned with respect to photoelectric conversion device 110 are coupled with each other. That is, positioning of second optical device 140 including light separation part 143 with respect to photoelectric conversion device 110 is not required. First optical device 130 does not include light separation part 143 (divided reflection surface 143a) that impedes image detection of photoelectric conversion element 112 through second optical surface 132 and first optical surface 131 from second optical surface 132 side, and therefore, without performing the active positioning, the position of photoelectric conversion element 112 can be detected by observation through second optical surface 132 and first optical surface 131 from second optical surface 132 side. Thus, according to the present invention, positioning of the optical receptacle with respect to the photoelectric conversion device can be easily achieved in a short time, and as a result, the optical module can be manufactured at a low cost and in a short time.

In addition, as described above, tolerance width B for positional displacement between first optical device 130 and second optical device 140 is larger than tolerance width C for positional displacement between optical transmission member 150 and optical receptacle 120, and tolerance width A for positional displacement between optical receptacle 120 (first optical device 130) and photoelectric conversion device 110. Therefore, the optical characteristics (coupling efficiency) of optical receptacle 120 are not degraded even when optical module 100 is manufactured by a mechanical fitting using a fitting structure of relatively low positional accuracy.

Optical receptacle 120 according to the present embodiment includes a plurality of members, first optical device 130 and second optical device 140, and as such the number of components of optical receptacle 120 is larger than that of a conventional optical receptacle composed of a single member. However, while optical receptacle 120 includes light separation part 143, optical receptacle 120 can be appropriately positioned with respect to photoelectric conversion device 110 without performing the active positioning, and therefore the degrees of freedom in design of the optical receptacle is high.

Figure 10A:
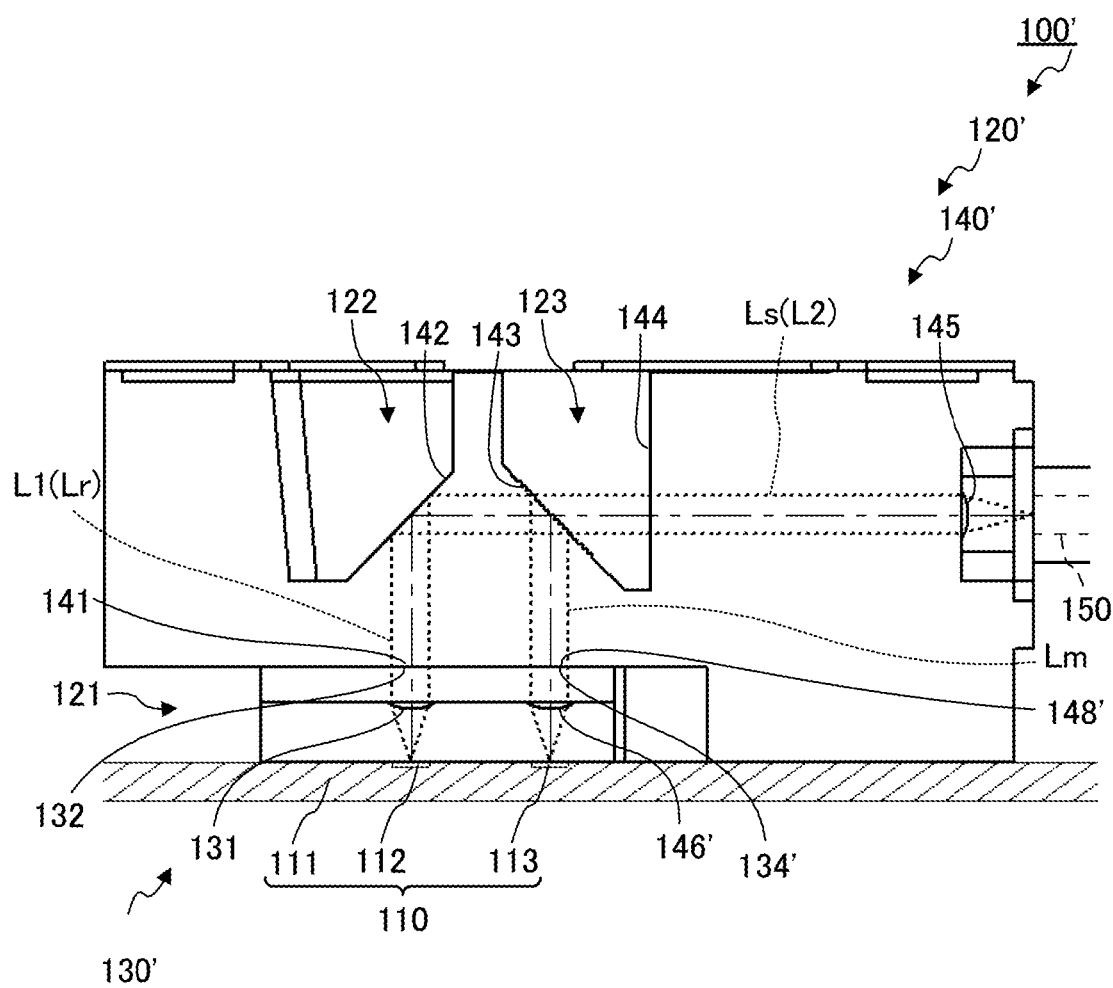
FIG. 10A is a sectional view schematically illustrating a configuration of an optical module according to a modification of the embodiment.
Figure 10B:
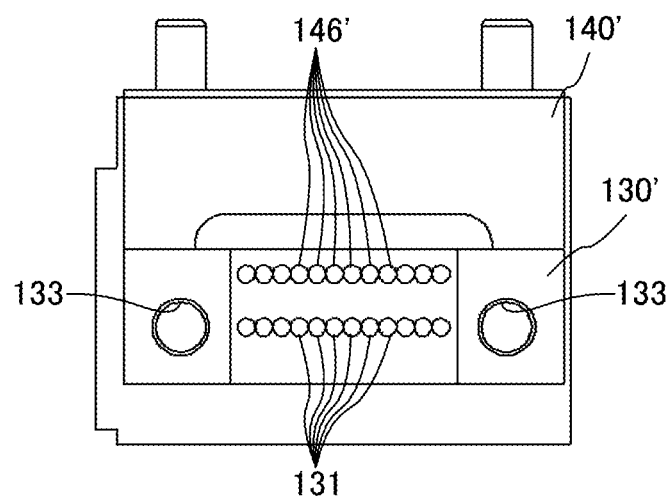
FIG. 10B is a sectional view schematically illustrating a configuration of an optical receptacle according to a modification of the embodiment.

While second optical device 140 includes fifth optical surface 146 in the present embodiment, the optical receptacle according to the embodiment of the present invention is not limited to this. For example, in the optical receptacle according to the embodiment of the present invention, the first optical device may include a fifth optical surface. FIG. 10A is a sectional view schematically illustrating a configuration of optical module 100' according to a modification of the embodiment, and FIG. 10B is a sectional view schematically illustrating a configuration of optical receptacle 120' according to a modification of the embodiment.

Optical receptacle 120' of optical module 100' according to the modification includes first optical device 130' and second optical device 140'. First optical device 130' includes first optical surface 131, second optical surface 132, first fitting part 133, seventh optical surface 134' and fifth optical surface 146'. Second optical device 140' includes third optical surface 141, reflection surface 142, light separation part 143, transmission surface 144, fourth optical surface 145, second fitting part 147 and sixth optical surface 148'.

Sixth optical surface 148' of second optical device 140' emits, toward first optical device 130', monitor light Lm that has been separated by light separation part 143 and has passed through the inside of second optical device 140'. The number of sixth optical surface 148' is not limited, and may be appropriately selected in accordance with the use. Sixth optical surface 148' is disposed opposite to seventh optical surface 134' of first optical device 130' in the bottom surface of second optical device 140'. The shape of sixth optical surface 148' is not limited, and may be a plane shape, or a curved shape. In the modification, sixth optical surface 148' has a plane shape. Sixth optical surface 148' having a plane shape is preferable in view of achieving a low manufacturing cost.

Seventh optical surface 134' of first optical device 130' allows, to enter first optical device 130', monitor light Lm that has passed through the inside of second optical device 140'. The number of seventh optical surface 134' is not limited, and may be appropriately selected in accordance with the use. Seventh optical surface 134' is disposed opposite to sixth optical surface 148' of second optical device 140' in the top surface of first optical device 130'. The shape of seventh optical surface 134' is not limited, and may be a plane shape or a curved shape. In the modification, seventh optical surface 134' has a plane shape. Seventh optical surface 134' with a plane shape is preferable in view of achieving a low manufacturing cost.

Fifth optical surface 146' of first optical device 130' emits, toward detection device 113, monitor light Lm that has been separated by light separation part 143 and has passed through the inside of second optical device 140' and first optical device 130'.

In optical module 100' according to the modification, a part of first emission light L1 reaching light separation part 143 is internally reflected by divided reflection surface 143a toward sixth optical surface 148' (detection device 113 side) and becomes monitor light Lm. Monitor light Lm is emitted out of second optical device 140' from sixth optical surface 148', and enters first optical device 130' from seventh optical surface 134'. At this time, monitor light Lm has been converted to collimate light, and is incident on sixth optical surface 148' and seventh optical surface 134' at an angle approximately perpendicular to sixth optical surface 148' and seventh optical surface 134'. Accordingly, monitor light Lm is not refracted, and is transmitted from second optical device 140' to first optical device 130' with almost no reflection.

It is to be noted that, in the step of positioning first optical device 130' in the manufacturing method of optical module 100' according to the modification, first optical device 130' is positioned such that one or more first optical surfaces 131 are respectively opposite to one or more photoelectric conversion elements 112, and respectively intersect the optical axes of first emission light L1 emitted from one or more photoelectric conversion elements 112 while detecting the position of photoelectric conversion element 112 through second optical surface 132 and first optical surface 131 from second optical surface 132 side of first optical device 130' disposed on substrate 111. At this time, as necessary, first optical device 130' may be positioned such that one or more fifth optical surfaces 146' are respectively opposite to one or more detection devices 113 while detecting the position of detection device 113 through seventh optical surface 134' and fifth optical surface 146' from seventh optical surface 134' side of first optical device 130'.

While optical receptacle 120 includes second optical device 140 having reflection surface 142 in the present embodiment, the optical receptacle according to the embodiment of the present invention is not limited to this. For example, the second optical device may not include reflection surface 142. In this case, the third optical surface and the fourth optical surface are disposed on the opposite sides in the second optical device. In this case, in the portion that functions as the transmitting optical module, first emission light L1 emitted from the photoelectric conversion element (light-emitting element) enters the second optical device from third optical surface, and then reaches light separation part 143 without being reflected by reflection surface 142. On the other hand, in the portion that functions as the receiving optical module, reception light Lr separated by light separation part 143 reaches third optical surface without being reflected by reflection surface 142.

In addition, instead of the configuration in which second optical device 140 has reflection surface 142, first optical device 130 may include reflection surface 142. In this case, in the portion that functions as the transmitting optical module, first emission light L1 emitted from the photoelectric conversion element (light-emitting element) enters first optical device 130 from first optical surface 131, and then reaches second optical surface 132 after being reflected by reflection surface 142. On the other hand, in the portion that functions as the receiving optical module, reception light Lr having entered first optical device 130 from second optical surface 132 is reflected by reflection surface 142, and then reaches first optical surface 131.

In the case where first optical device 130 includes reflection surface 142, first optical surface 131 and second optical surface 132 are not disposed on the opposite sides in first optical device 130. In view of this, when positioning first optical device 130 with respect to photoelectric conversion device 110, detection of the position of photoelectric conversion element 112 has to be performed in a direction along the surface of substrate 111 through second optical surface 132, reflection surface 142 and first optical surface 131. In the case where the position of photoelectric conversion element 112 is detected in the direction along the surface of substrate 111, first optical device 130 is required to be disposed in the proximity of an end portion of substrate 111 in order to bring the detection apparatus closer to second optical surface 132. Accordingly, in the case where first optical surface 131 and second optical surface 132 are not disposed on the opposite sides in first optical device 130, the position for disposing first optical device 130 on substrate 111 is limited.

On the other hand, in the case where first optical device 130 does not include reflection surface 142, first optical surface 131 and second optical surface 132 are disposed on the opposite sides in first optical device 130. With this configuration, the position of photoelectric conversion element 112 can be detected in a direction perpendicular to the front surface of substrate 111 through second optical surface 132 and first optical surface 131. In the case where the position of photoelectric conversion element 112 is detected in a direction perpendicular to the front surface of substrate 111, the position of photoelectric conversion element 112 can be appropriately detected by bringing the detection apparatus close to second optical surface 132 no manner where first optical device 130 is disposed on substrate 111. In view of this, it is preferable that first optical surface 131 and second optical surface 132 be disposed on the opposite sides in first optical device 130.

In addition, in the present embodiment, optical receptacle 120 includes: first optical device 130 including a plurality of first optical surfaces 131 and a plurality of second optical surfaces 132; and second optical device 140 including a plurality of third optical surfaces 141, a plurality of fourth optical surfaces 145 and a plurality of fifth optical surfaces 146, the optical receptacle according to the embodiment of the present invention is not limited to this. For example, it is also possible to adopt an optical receptacle including: a first optical device including one first optical surface 131 and one second optical surface 132; and a second optical device including one third optical surface 141, one fourth optical surface 145 and one fifth optical surface 146.

Further, a reflection film composed of a thin film of a metal having a high light reflectance (such as Al, Ag and Au) may be formed on reflection surface 142 and divided reflection surface 143a. In the case where reduction of the number of components is desired to be prioritized, it is preferable to employ a configuration in which only a total reflection surface is utilized.

This application is entitled to and claims the benefit of Japanese Patent Application No. 2016-041318 filed on Mar. 3, 2016, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

10 Optical module
20 Photoelectric conversion device
21 Light-emitting element
22 Optical transmission member
23 End surface
24 Detection device
30 Optical receptacle
31 First optical surface
32 Reflection surface 33 Light separation part
33a Divided reflection surface
33b Divided transmission surface
34 Transmission surface
35 Second optical surface
36 Third optical surface
37 Recess
L Emission light
100, 100' Optical module
110 Photoelectric conversion device
111 Substrate
112 Photoelectric conversion element
113 Detection device
120, 120' Optical receptacle
121 First recess
122 Second recess
123 Third recess
130, 130' First optical device
131 First optical surface
132 Second optical surface
133 First fitting part
134' Seventh optical surface
140, 140' Second optical device
141 Third optical surface
142 Reflection surface
143 Light separation part
143a Divided reflection surface
143b Divided transmission surface
143c Divided step surface
144 Transmission surface
145 Fourth optical surface
146, 146' Fifth optical surface
147 Second fitting part
148' Sixth optical surface
150 Optical transmission member
L1 First emission light
L2 Second emission light
Ls Signal light
Lm Monitor light
Lr Reception light

The invention claimed is:

1. An optical receptacle configured to be disposed between an optical transmission member and a photoelectric conversion device, the photoelectric conversion device including a photoelectric conversion element and a detection device for monitoring emission light emitted from the photoelectric conversion element which are disposed on a substrate, the optical receptacle being configured to optically couple the photoelectric conversion element and an end surface of the optical transmission member, the optical receptacle comprising:
a first optical device including a first fitting part disposed in a surface different from a surface opposite to the substrate, the first optical device being disposed on the substrate so as to be opposite to the photoelectric conversion element; and
a second optical device including a second fitting part configured to be fitted to the first fitting part, the second optical device being disposed on the substrate so as to be opposite to the first optical device and the detection device;
wherein the first optical device includes:
a first optical surface configured to allow incidence of a first emission light emitted from the photoelectric conversion element, or to emit, toward the photoelectric conversion element, a reception light that is a part of a second emission light that has been emitted from the end surface of the optical transmission member and has passed through an inside of the second optical device and the first optical device, and
a second optical surface configured to emit the first emission light toward the second optical device, or to allow incidence of the reception light that has passed through the inside of the second optical device,
wherein the second optical device includes:
a third optical surface configured to allow incidence of the first emission light that has passed through the inside of the first optical device, or to emit, toward the first optical device, the reception light that has passed through the inside of the second optical device,
a fourth optical surface configured to emit, toward the end surface of the optical transmission member, a signal light that is a part of the first emission light and has passed through the inside of the first optical device and the second optical device, or to allow incidence of the second emission light emitted from the end surface of the optical transmission member,
a light separation part disposed on a light path between the third optical surface and the fourth optical surface, and configured to separate the first emission light incident on the third optical surface into monitor light travelling toward the detection device and the signal light travelling toward the end surface of the optical transmission member, or to advance, toward the third optical surface side, the reception light that is a part of the second emission light incident on the fourth optical surface, and
a fifth optical surface configured to emit, toward the detection device, the monitor light separated by the light separation part,
wherein the light separation part includes:
a plurality of divided reflection surfaces that are surfaces inclined with respect to an optical axis of the first emission light, and
a plurality of divided transmission surfaces that are surfaces perpendicular to optical axes of the first emission light and the second emission light,
wherein the plurality of divided reflection surfaces and the plurality of divided transmission surfaces are alternately disposed along an inclination direction of the divided reflection surface,
wherein the plurality of divided reflection surfaces internally reflect, toward the fifth optical surface, a part of the first emission light as the monitor light,
wherein the plurality of the divided transmission surfaces allow, to pass through the plurality of the divided transmission surfaces toward the fourth optical surface side, a part of the first emission light as the signal light, or to allow, to pass through the plurality of the divided transmission surfaces toward the third optical surface side, a part of the second emission light as the reception light, and
wherein the first optical device is not provided between the fifth optical surface and the detection device.

2. The optical receptacle according to claim 1,
wherein a first tolerance width is larger than any of a second tolerance width or a third tolerance width, the first to third tolerance widths being set for maintaining reduction of a coupling efficiency between the photoelectric conversion element and the end surface of the optical transmission member within a predetermined range, wherein the first tolerance width is a tolerance width for positional displacement, in a direction perpendicular to a fitting direction of the first fitting part and the second fitting part, of the first optical device and the second optical device coupled with each other and the first fitting part and the second fitting part being fitted with each other, wherein the second tolerance width is a tolerance width for the positional displacement of the first optical device and the photoelectric conversion device in a direction perpendicular to the optical axis of the first emission light, and wherein the third tolerance width is a tolerance width for positional displacement of the optical transmission member and the second optical device in a direction perpendicular to the optical axis of the second emission light.

3. The optical receptacle according to claim 1, wherein the second optical device further includes a reflection surface configured to reflect, toward the fourth optical surface, the first emission light incident on the third optical surface, or reflect, toward the third optical surface, the reception light incident on the fourth optical surface.

4. An optical module comprising:
a photoelectric conversion device; and
the optical receptacle according to claim 1,
wherein the photoelectric conversion device includes:
a substrate,
a photoelectric conversion element disposed on the substrate and including a light emission region or a light reception region, and
a detection device disposed on the substrate and configured to monitor emission light emitted from the light emission region of the photoelectric conversion element.

5. The optical module according to claim 4, wherein the first optical device and the second optical device are coupled with each other with the second optical surface and the third optical surface being in contact with each other.

6. The optical module according to claim 4, further comprising, a refractive index adjusting part disposed between the second optical surface and the third optical surface, the refractive index adjusting part having a refractive index closer to a refractive index of the first optical device or a refractive index of the second optical device than a refractive index of air.

7. A manufacturing method of the optical module according to claim 4, the method comprising:
disposing the first optical device on the substrate of the photoelectric conversion device;
positioning the first optical device such that the first optical surface is opposite to the photoelectric conversion element, and the first optical surface intersects the optical axis of the first emission light emitted from the photoelectric conversion element while detecting a position of the photoelectric conversion element through the first optical surface from the second optical surface side of the first optical device disposed on the substrate; and
coupling the second optical device with the first optical device positioned on the substrate by fitting the first fitting part and the second fitting part to each other.

8. The method according to claim 7, wherein, in the coupling of the first optical device with the second optical device, the first optical device and the second optical device are coupled with each other such that the second optical surface and the third optical surface are in contact with each other.

9. The method according to claim 7, further comprising:
disposing a refractive index adjusting part on the second optical surface to provide the refractive index adjusting part between the second optical surface and the third optical surface, the refractive index adjusting part having a refractive index closer to a refractive index of the first optical device or a refractive index of the second optical device than a refractive index of air.

* * * * *